US006849961B2

(12) United States Patent
Takizawa et al.

(10) Patent No.: US 6,849,961 B2
(45) Date of Patent: Feb. 1, 2005

(54) ENGINE GENERATOR

(75) Inventors: Toshiaki Takizawa, Saitama (JP); Tadahiro Yaguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 150 days.

(21) Appl. No.: 10/231,030

(22) Filed: Aug. 30, 2002

(65) Prior Publication Data

US 2003/0071463 A1 Apr. 17, 2003

(30) Foreign Application Priority Data

Sep. 30, 2001 (JP) ....................................... 2001-265910

(51) Int. Cl.$^{7}$ ................................................ H02P 9/04

(52) U.S. Cl. ....................... 290/1 A; 290/1 R; 290/1 C; 123/195 C

(58) Field of Search ................................ 290/1 R, 1 A, 290/1 C; 123/195 C

(56) References Cited

U.S. PATENT DOCUMENTS 3,714,449 A * 1/1973 De Bella .................... 290/1 C
4,856,470 A * 8/1989 Ishii et al. .............. 123/195 C
4,883,024 A * 11/1989 Ito et al. .................... 123/41.7
5,007,383 A * 4/1991 Ito et al. .................. 123/41.49
5,121,715 A * 6/1992 Nogami et al. ............ 123/41.7
5,899,174 A * 5/1999 Anderson et al. .............. 123/2
6,091,160 A * 7/2000 Kouchi et al. .............. 290/1 A
6,378,469 B1 * 4/2002 Hiranuma et al. ....... 123/41.56

FOREIGN PATENT DOCUMENTS

DE 4141533 A1 * 6/1993 ........... F02B/63/04
EP 931920 A2 * 7/1999 ........... F02B/63/04

* cited by examiner

*Primary Examiner*—Joseph Waks
(74) *Attorney, Agent, or Firm*—Arent Fox, PLLC

(57) ABSTRACT

In an engine generator, a pair of wall plate members are opposed to each other at a distance. Accommodated between the wall plate members are an engine having a crankshaft perpendicular to the wall plate members; an outer-rotor type generator also serving as a flywheel and connected directly to the crankshaft; an intake system device disposed on one side of the engine in a plane perpendicular to an axis of the crankshaft; and an exhaust system device disposed on the other side of the engine in the plane. Thus, the engine generator can be accommodated in a limited space.

7 Claims, 3 Drawing Sheets

ENGINE GENERATOR

BACKGROUND OF THE INVENTION

1. Field of the Invention

The present invention relates to an engine generator of a type embedded in a wall, which is placed utilizing a limited space, such as a power source device of a type mounted on a vehicle.

2. Description of the Related Art

In a relatively large-sized vehicle such as a bus and a leisure vehicle, it is difficult to provide electric power for sustaining electric load by an air conditioner or other components only by means of a generator mounted to an engine for providing a driving force for the vehicle, and in some cases an engine generator for a power source is installed in addition to such a generator.

In this case, a space for accommodating the engine generator for the power source is secured within the vehicle, and the construction of the engine generator is devised so that it can be accommodated in such a space.

Even if the generator is not a large-sized one, it is very difficult to secure a space partitioned exclusively for installation of the generator within the vehicle. Even if the space is secured, various limitations are often imposed on the other spaces within the vehicle.

In addition, an engine generator is equipped in a temporary housing set up in a construction site and the like in some cases. Conventionally, the engine generator is installed outdoors, and a space for installation of the engine generator must be therefore secured outdoors.

SUMMARY OF THE INVENTION

Accordingly, it is an object of the present invention to provide an engine generator which can be accommodated in a limited space.

To achieve the above object, according to a first feature of the present invention, there is provided an engine generator comprising: a pair of wall plate members opposed to each other at a distance; an engine having a crankshaft perpendicular to the wall plate members; an outer-rotor type generator also serving as a flywheel and connected directly to the crankshaft; an intake system device disposed on one side of the engine in a plane perpendicular to an axis of the crankshaft; and an exhaust system device disposed on the other side of the engine in such plane; the engine, the generator, the intake system device and the exhaust system device being accommodated between the wall plate members.

With this arrangement of the first feature, the engine is disposed between the wall plate members in such a manner that the crankshaft is perpendicular to the pair of wall plate members; the outer-rotor type generator also serving as the flywheel is connected directly to the crankshaft; and the intake and exhaust system devices are disposed on the opposite sides of the engine in the plane perpendicular to the axis of the crankshaft. Therefore, the engine generator can be constructed compactly between the wall plate members and accommodated easily between the wall plate members.

According to a second feature of the present invention, in addition to the arrangement of the first feature, a frame constituting a wall together with the wall plate members is disposed between the wall plate members, and suspending members suspended down from the frame are connected at their lower ends to brackets mounted on the engine. With this arrangement, the engine can be stably supported within the wall in spite of a small size of the engine in a direction of the thickness of the wall.

According to a third feature of the present invention, in addition to the arrangement of the second feature, a lower portion of the engine having a substantially horizontal cylinder axis is mounted and supported on the frame, and the exhaust system device is disposed below the engine. With this arrangement, the engine can be appropriately supported on the frame in such a manner that the lower position of the engine having the exhaust side at the lower location is supported on the frame, and the upper portion of the engine which suffers a small amount of vibration is supported by suspension from the frame.

According to a fourth feature of the present invention, in addition to the arrangement of the first feature, a control unit for controlling the generator is disposed on one side of a crankcase included in the engine. With this arrangement, the control unit can be accommodated within the wall and supported on the engine, without an increase in thickness of the wall.

According to a fifth feature of the present invention, in addition to the arrangement of the third feature, an exhaust passage opening at one end thereof into an installation portion of the frame for the engine in such a manner that it leads to the exhaust system device, is provided in the frame in such a manner that the other end opens to the outside of the wall. With this arrangement, an exhaust gas from the engine can be discharged to the outside of the wall by utilizing the inside of the frame supporting the engine.

According to a sixth feature of the present invention, in addition to the arrangement of the first feature, a ventilating opening is provided in the wall formed at least in part by the wall plate members; a fan for agitating air within the wall is mounted on a rotor of the generator; and a radiator exposed to an air flow generated by the fan is disposed sideways from the engine between the wall members. With this arrangement, a heat radiated from the radiator can be discharged out of the wall, while being diffused by the fan, and the engine generator can be easily accommodated in the wall.

The above and other objects, features and advantages of the invention will become apparent from the following description of the preferred embodiment taken in conjunction with the accompanying drawings.

BRIEF DESCRIPTION OF THE DRAWINGS

FIG. 1 is a side view of a rear portion of a vehicle.

FIG. 2 is a sectional view taken along a line 2—2 in FIG. 1.

FIG. 3 is a sectional view taken along a line 3—3 in FIG. 2.

DESCRIPTION OF THE PREFERRED EMBODIMENT

The present invention will now be described by way of an embodiment shown in the accompanying drawings.

Figure 1:
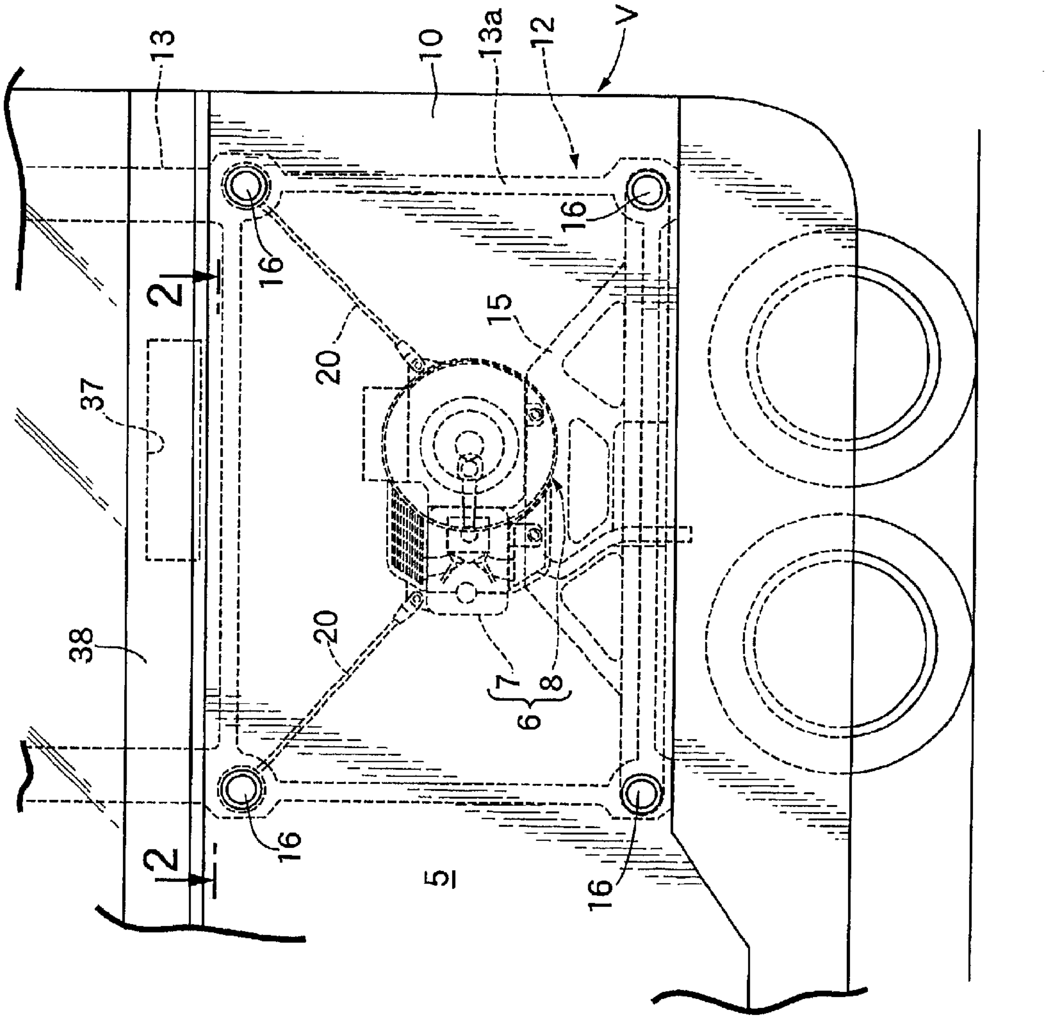
FIGS. 1 to 3 show an embodiment according to the present invention.
Figure 2:
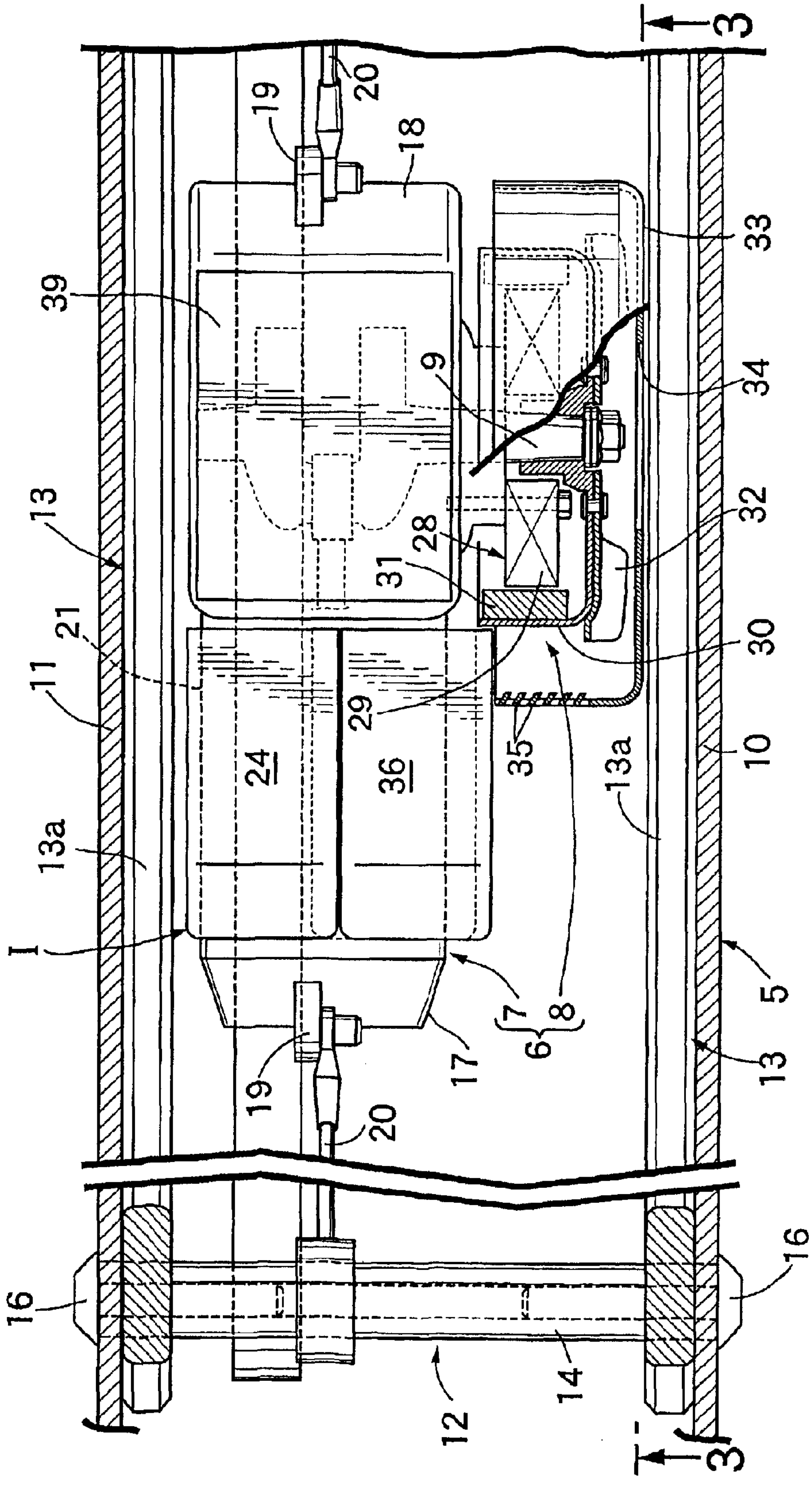

Referring first to FIGS. 1 and 2, rear portions of opposite sides of a vehicle V are formed as flat surfaces vertical to a road surface, and an engine generator 6 is accommodated, for example, within a wall of a left rear portion of the vehicle.

Figure 3:
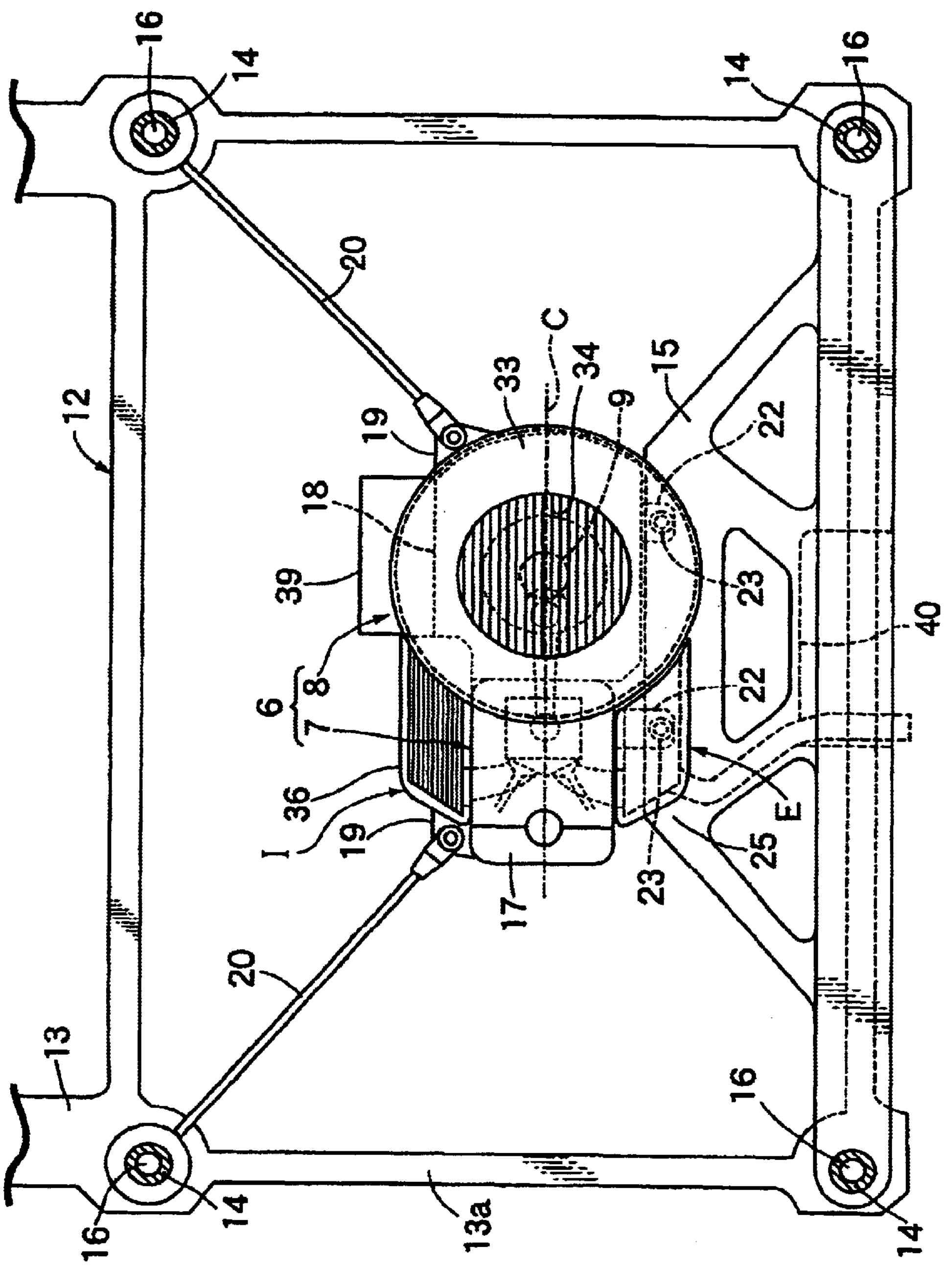

Referring also to FIGS. 2 and 3, the engine generator 6 includes a 4-cycle single-cylinder engine 7, and an outer-rotor type generator 8 also serving as a flywheel and connected directly to a crankshaft 9 of the engine 7. The generator 8 also functions as a motor for starting the engine 7.

The wall 5 is comprised of a pair of wall plate member 10 and 11 opposed to each other at a distance, and a frame 12 which supports the wall plate members 10 and 11 from inside, and the engine 7 is supported on the frame 12.

The frame 12 includes a pair of frame members 13, 13 disposed at a distance from each other, four spacers 14 each formed into a cylindrical shape and interposed between the frame members 13, 13, and an installation rest 15 supported on two of the spacers 14.

Right-angle quadrilateral support frame portions 13*a* are formed at lower portions of the frame members 13, respectively. The spacers 14 are disposed between four corners of one of the support frame portions 13*a*, 13*a* and the corresponding four corners of the other of the frame portions 13*a*, 13*a*. The frame members 13, 13 are disposed to come into contact with inner surfaces of the wall plate members 10 and 11. Bolts 16 are passed through the wall plate members 10 and 11 from their outer faces to be screwed into the spacers 14, whereby the wall plate members 10 and 11 are mounted to the frame 12.

The engine 7 is disposed between the frame members 13, 13 with a cylinder axis C and an axis of the crankshaft 9 being substantially horizontal. Brackets 19, 19 are mounted at upper portions of a head cover 17 and a crankcase 18 in the engine 7, respectively. On the other hand, suspending members 20, 20 are suspended from upper two of the four spacers 14 of the frame 12, and connected at their lower ends to the brackets 19, 19, respectively.

The installation rest 15 is formed into a trapezoidal shape in such a manner that a lower portion thereof is supported at its opposite ends on lower two of the four spacers 14 of the spacer 12. Support plates 22, 22 are mounted on a cylinder portion 21 and the crankcase 18 of the engine 7, and supported on the installation rest 15 with mount rubbers 23 or the like interposed therebetween. In other words, the lower portion of the engine 7 is resiliently mounted and supported on the installation rest 15.

An intake system device I for the engine 7, including an air cleaner 24, is disposed on one side of the engine 7 in a plane perpendicular to the axis of the crankshaft 9. An exhaust system device E for the engine 7, including an exhaust muffler 25, is disposed on the other side of the engine 7 in the plane perpendicular to the axis of the crankshaft 9.

The engine 7 is supported on the frame 12 in an attitude with its intake side being an upper side and its exhaust side being a lower side. The intake system device I accommodated between the wall plate members 10 and 11 is disposed above the engine 7, while the exhaust system device E accommodated between the wall plate members 10 and 11 is disposed below the engine 7.

Referring especially carefully to FIG. 2, the generator 8 is comprised of a stator 29 fixed to the crankcase 18 and having a coil 28, a rotor 30 fixed to the crankshaft 9 to surround the stator 29, and permanent magnets 31 fixed to an inner periphery of the rotor 30 so that they are opposed to the coil 28. A fan 32 is fixed to the rotor 30.

The rotor and the fan 32 are covered with a bowl-shaped fan cover 33, and a suction port 34 is provided at a central portion of the fan cover 33. A radiator 36 accommodated between the wall plate members 10 and 11 is disposed above the engine 7 at a location adjoining the air cleaner 24. A plurality of discharge ports 35 for discharging air toward the radiator 36 are provided in a portion of an outer periphery of the fan cover 33 on the side of the radiator 36.

The air within the wall 5 is agitated in response to the rotation of the fan 32 along with the crankshaft 9. In order to conduct the air ventilation between the inside and the outside of the wall 5 to smoothly conduct the agitation of the air, a ventilating opening 37 is provided in the wall plate member 10 of the wall 6, for example, at a location above the engine generator 6. In order to prevent the ventilating opening 37 from remaining exposed to the outside, a band-shaped decorative member 38 is mounted at a vertically intermediate portion of the outer surface of the wall 6, to cover the ventilating opening 37 from the outside, while enabling the flowing of air through the ventilating opening 37.

An output from the generator 6 is controlled by a control unit 39 which is accommodated in the wall 5 and includes an inverter circuit. The control unit 39 is disposed on one side of the crankcase 18, the one side being an upper side of the crankcase 18.

An exhaust passage 40 is defined in the installation rest 15 in the frame 12 in such a manner that its one end opens into an installation portion of the installation rest 15 for the engine 7 to leads to the exhaust muffler 25 of the exhaust system device E. The other end of the exhaust passage 40 opens into a lower end of the wall 5 in order to enable the discharge of an exhaust gas out of the wall 5.

The operation of this embodiment will be described below. Accommodated between the pair of wall members 10 and 11 which are opposed to each other at the distance are the engine 7 having the crankshaft 9 perpendicular to the wall members 10 and 11; the outer-rotor type generator 8 also serving as the flywheel and connected directly to the crankshaft 9; the intake system device I disposed on one side of the engine 7 in the plane perpendicular to the axis of the crankshaft 9; and the exhaust system device E disposed on the other side of the engine 7 in the plane. Therefore, the engine generator 6 can be constructed compactly between the wall members 10 and 11 to be easily accommodated between the wall members 10 and 11.

The frame 12 constituting the wall 5 together with the wall members 10 and 11 is disposed between the wall members 10 and 11, and the suspending members 20, 20 suspended from the frame 12 are connected at their lower ends to the brackets 19, 19 mounted on the head cover 17 and the crankcase 18 of the engine 7. Therefore, the engine 7 can be stably supported in spite of a small size of the engine 7 in a direction of the thickness of the wall 5.

Moreover, the lower portion of the engine 7 having the substantially horizontal cylinder axis C is mounted and supported on the installation rest 15, and the exhaust system device E including the exhaust muffler 25 is disposed below the engine 7. Therefore, the engine 7 can be appropriately supported on the frame 12 in such a manner that the lower portion of the engine 7 having the exhaust side at the lower position is supported on the frame 12, and the upper portion of the engine 7 which suffers a small amount of vibration is supported by suspension from the frame 12.

In addition, the ventilating opening 37 is provided in the wall 5. The fan 32 for agitating the air within the wall 5 is mounted on the rotor 30 of the generator 8. The radiator 36 exposed to the air flow generated by the fan 32 is disposed sideways from the engine 7 between the wall members 10 and 11. Therefore, a heat radiated from the radiator 36 can be discharged out of the wall 5, while being diffused by the fan 32, and the engine generator 6 can be easily accommodated in the wall 5.

Moreover, the control unit 39 for controlling the output from the generator 8 is disposed above the crankcase 18 of the engine 7. Therefore, the control unit 39 can be accommodated within the wall 5 and supported on the crankcase 18 of the engine 7, without an increase in thickness of the wall 5.

Further, the exhaust passage 40 opening at one end thereof into the installation portion of the frame 12 for the engine 7 in such manner that it leads to the exhaust muffler 25, is provided in the installation rest 15 of the frame 12 so that the other end thereof opens to the outside of the wall 5. Therefore, the exhaust gas from the engine 7 can be discharged to the outside of the wall 5 by utilizing the inside of the frame 12 supporting the engine 7.

Although the embodiment of the present invention has been described, it will be understood that the present invention is not limited to the above-described embodiment, and various modifications in design may be made without departing from the spirit and scope of the invention defined in the claims.

For example, the engine generator 6 accommodated within the wall 5 of the vehicle has been described in the embodiment, but the present invention is effectively applicable to a wall of a temporary housing set up in a construction site and the like.

What is claimed is:

1. An engine generator comprising:

a pair of wall plate members opposed to each other at a distance;

an engine having a crankshaft perpendicular to said wail plate members;

an outer-rotor type generator also serving as a flywheel and connected directly to said crankshaft;

an intake system device disposed on one of opposite sides of said engine in a plane perpendicular to an axis of said crankshaft;

an exhaust system device disposed on the other of the opposite sides of said engine in said plane;

a frame disposed between said wall plate members; and suspending members suspended down from said frame and connected at their lower ends to said engine; and said engine, said generator, said intake system device and said exhaust system device being accommodated between said wall plate members.

2. An engine generator according to claim 1, wherein said frame comprising a wall together with said wall plate members and said suspending members are connected at their lower ends to brackets mounted on said engine.

3. An engine generator according to claim 2, wherein a lower portion of said engine having a substantially horizontal cylinder axis is mounted and supported on said frame, and said exhaust system device is disposed below said engine.

4. An engine generator according to claim 1, further including a control unit disposed on one side of a crankcase included in said engine for controlling said generator.

5. An engine generator according to claim 3, further including an exhaust passage opening at one end thereof into an installation portion of said frame for said engine in such a manner that it leads to said exhaust system device, said exhaust passage being provided in said frame in such a manner that the other end opens to the outside of said wall.

6. An engine generator according to claim 1, further including: a ventilating opening provided in said wall formed at least in part by said wall plate members; a fan mounted on a rotor of said generator for agitating air within said wall; and a radiator which is exposed to an air flow generated by said fan and which is disposed sideways from said engine between said wall members.

7. An engine generator according to claim 1, wherein said frame includes spacers which are extended between the wall plate members to hold said wall plate members at said distance.

* * * * *

UNITED STATES PATENT AND TRADEMARK OFFICE

CERTIFICATE OF CORRECTION

PATENT NO. : 6,849,961 B2
DATED : February 1, 2005
INVENTOR(S) : Toshiaki Takizawa et al.

It is certified that error appears in the above-identified patent and that said Letters Patent is hereby corrected as shown below:

<u>Title page</u>,
Item [30], Foreign Application Priority Data, please delete “Sep. 30, 2001” and substitute therefor -- Sep. 3, 2001 --.

Signed and Sealed this

Seventeenth Day of May, 2005

JON W. DUDAS
*Director of the United States Patent and Trademark Office*